United States Patent
Agyeman

(10) Patent No.: US 11,599,119 B2
(45) Date of Patent: Mar. 7, 2023

(54) METHOD AND SYSTEM FOR A SENSOR TRIGGER HUB

(71) Applicant: EMBARK TRUCKS, INC., San Francisco, CA (US)

(72) Inventor: Kwabena Agyeman, San Francisco, CA (US)

(73) Assignee: EMBARK TRUCKS, INC, San Francisco, CA (US)

( * ) Notice: Subject to any disclaimer, the term of this patent is extended or adjusted under 35 U.S.C. 154(b) by 0 days.

(21) Appl. No.: 17/386,913

(22) Filed: Jul. 28, 2021

(65) Prior Publication Data
US 2023/0035972 A1 Feb. 2, 2023

(51) Int. Cl.
| | |
|---|---|
| G06V 20/56 | (2022.01) |
| G01S 19/47 | (2010.01) |
| G05D 1/02 | (2020.01) |
| G05D 1/00 | (2006.01) |

(52) U.S. Cl.
CPC ......... *G05D 1/0231* (2013.01); *G05D 1/0088* (2013.01); *G06V 20/56* (2022.01)

(58) Field of Classification Search
None
See application file for complete search history.

(56) References Cited

U.S. PATENT DOCUMENTS

| | | | |
|---|---|---|---|
| 2020/0116502 A1* | 4/2020 | Xu | G01C 21/26 |
| 2021/0356915 A1* | 11/2021 | Wang | G01S 19/421 |
| 2022/0182213 A1* | 6/2022 | Han | G01S 19/01 |

* cited by examiner

*Primary Examiner* — Samuel D Fereja
(74) *Attorney, Agent, or Firm* — Buckley, Maschoff & Talwalkar LLC

(57) ABSTRACT

A system and method, optionally implemented in a hardware circuitry, to receive a global positioning system pulse per second, GPS PPS, signal generated by a GPS receiver in a vehicle having a plurality of sensors; monitor the GPS PPS signal for an indication of a presence and a frequency of the GPS PPS signal within a predetermined threshold; generate a generated PPS signal synchronized with the GPS PPS signal; generate, based on an input of the generated PPS signal, a plurality of trigger signals, each of the generated plurality of trigger signals being selectively programmatically adjustable in at least one of a frequency and a phase, the selectively adjustability of each of the generated plurality of trigger signals being independent of the other generated plurality of trigger signals; and transmit at least one of the generated plurality of trigger signals to one or more of the sensors.

20 Claims, 9 Drawing Sheets

| TRIGGER TYPE | TRIGGER FREQUENCY | TRIGGER REQUIREMENTS |
|---|---|---|
| Camera Trigger 1 (455) | 20 Hz | Active Low, 5 ms per pulse |
| Camera Trigger 2 (460) | 20 Hz | Active High, 5 ms per pulse |
| Lidar Trigger (465) | 1 Hz | Active High, 100 ms per pulse |
| IMU Trigger (470) | 1 Hz | Active High, 5 µs per pulse |
| Computer PPS (475) | 1 Hz | Active High, 100 ms per pulse |

METHOD AND SYSTEM FOR A SENSOR TRIGGER HUB

BACKGROUND

Autonomous and semi-autonomous vehicles (e.g., self-driving vehicles) include sensors, devices, and systems that need to function together in synchronized harmony in order for these types of vehicles to operate accurately and reliably safely. A GPS (global positioning system) receiver unit typically generates a pulse per second (PPS) signal. Previously, some self-driving vehicles have used the GPS PPS signal as a reference in connection with driving or otherwise triggering the sensors, devices, and systems in the vehicle. However, triggering the sensors and other devices using the GPS PPS signal has been shown to be less reliable than desired and/or required in self-driving vehicles where continued operating accuracy and reliability are a top priority for the safe operation of self-driving vehicles. In some instances, the variety and/or number of sensors in the vehicle and their corresponding number of different timing signal requirements caused electrical load problems, which caused the trigger pulse to change in its shape and form and led to false triggering, compounding the shortcomings in the prior art GPS PPS-based approaches. The false triggering caused the sensors to, for example, skip images, to reset their timestamps too early, etc. that created uncertainties regarding when data was arriving and/or when that data was captured as well as whether the sensors were capturing data in a synchronized manner.

There are some techniques and protocols for synchronizing clocks in computer networks. However, such synchronization protocols may not be suitable for the wide variety of sensors, devices, and systems that might typically be included in a self-driving vehicle. For example, the Precision Time Protocol (PTP) is an ethernet-based protocol that allows computers to synchronize their internal clocks using ethernet packets to exchange messages, wherein network transit times are determined so that the networked devices' internal clocks can be accurately synchronized. In many instances, one or more of the sensors, devices, and other systems included in a self-driving vehicle may lack the functionality to support PTP and/or other sophisticated time synchronization protocols and techniques.

As such, there exists a need for a system and method to provide accurate time synchronization for a plurality of sensors and other devices and systems of a self-driving vehicle in an efficient manner. Such a system and method should not require modification of the embedded devices and systems of the self-driving vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
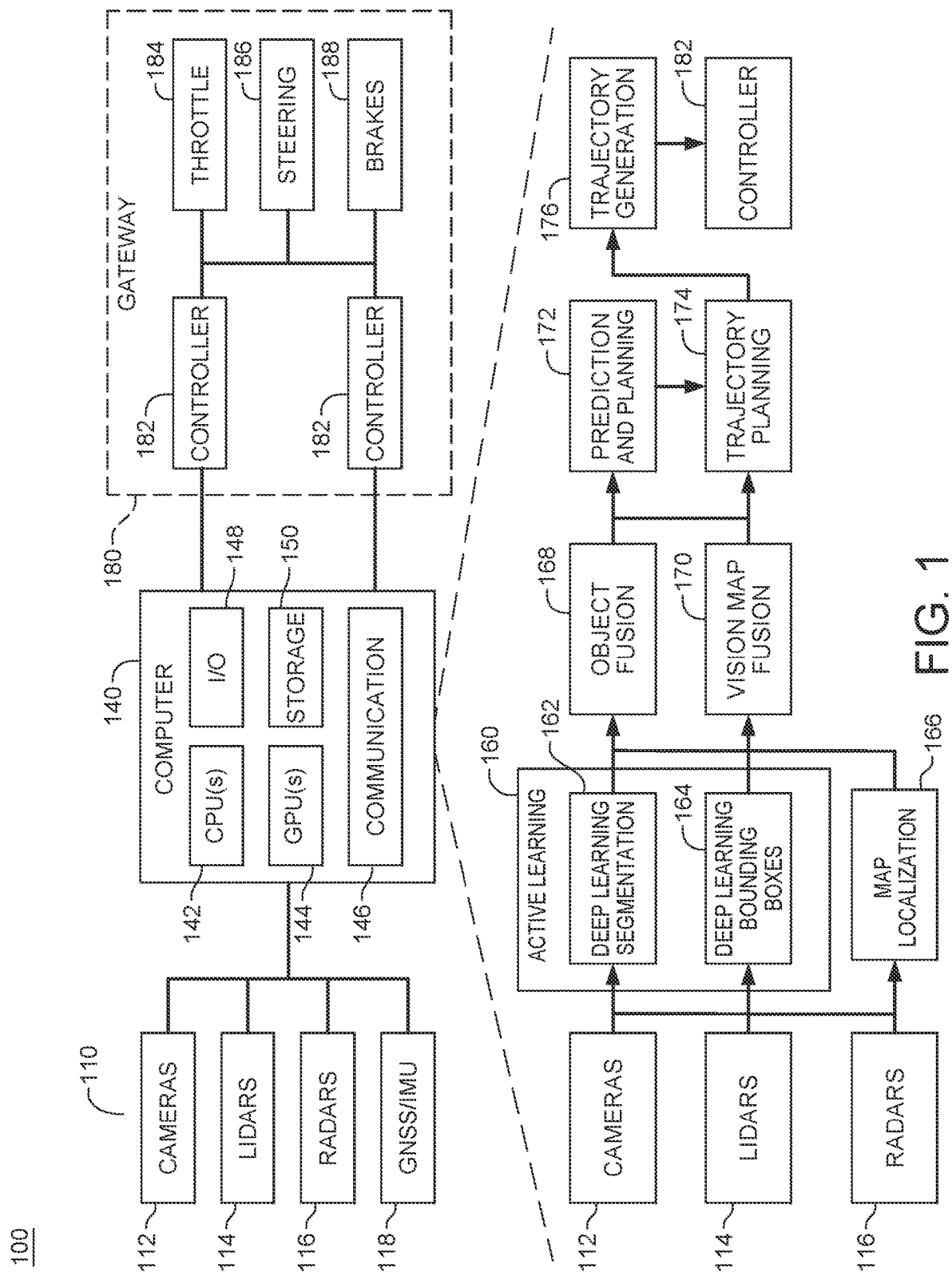
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

Figure 2A:
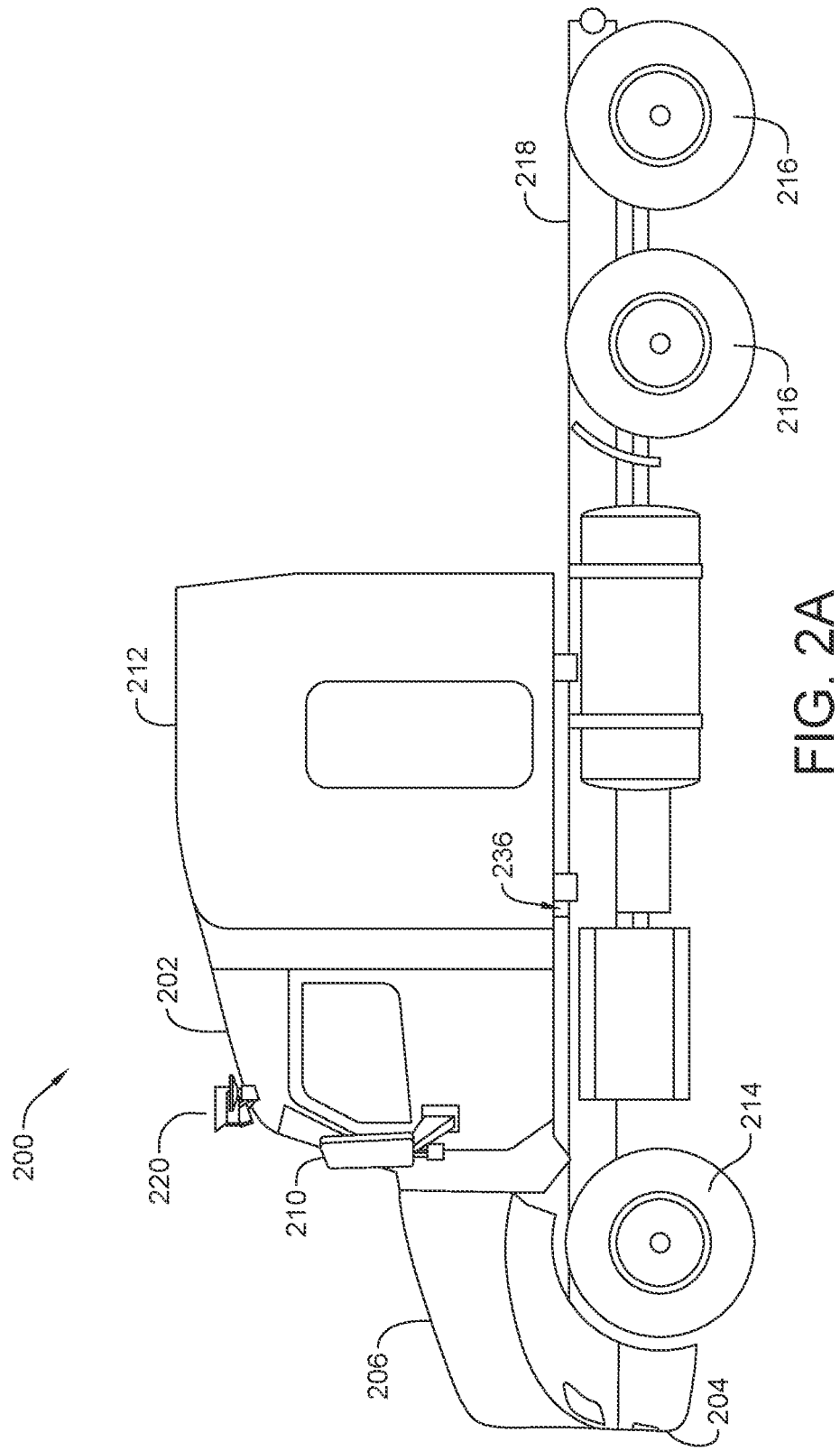
FIGS. 2A-2C are illustrative depictions of exterior views of a semi-truck, in accordance with example embodiments.
Figure 2B:
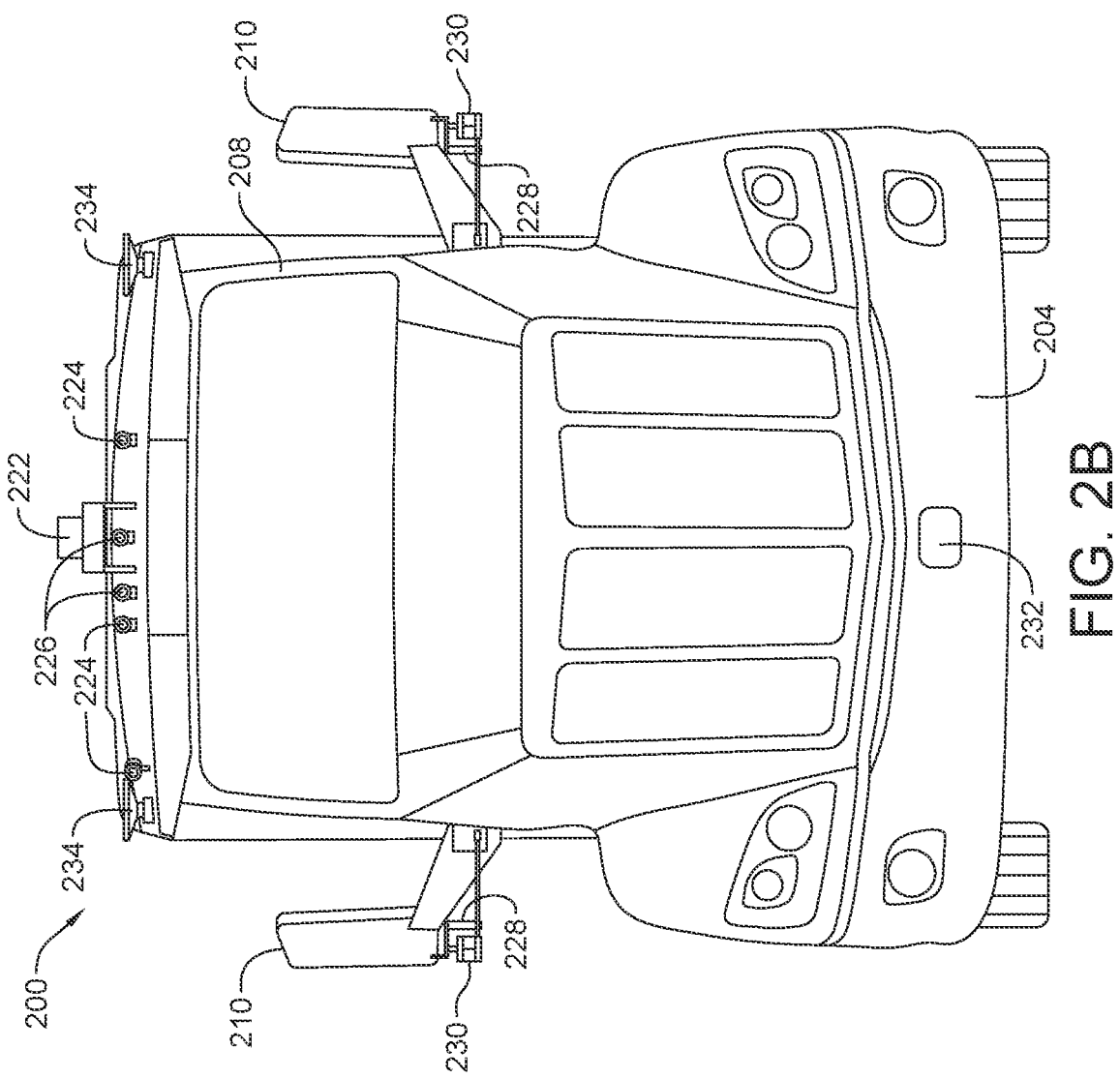
Figure 2C:
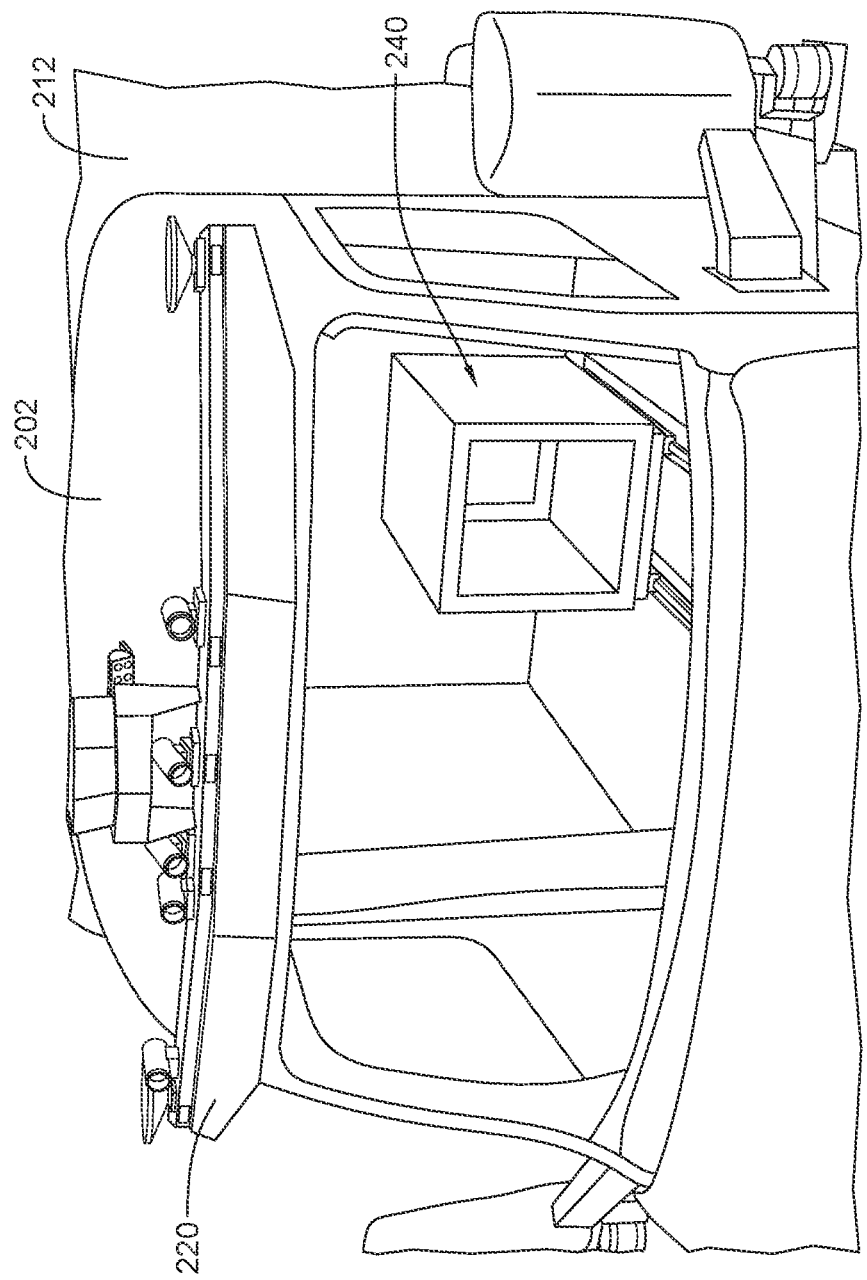

FIG. 1 illustrates a control system 100 that may be deployed in a vehicle such as, for example though not limited to, a semi-truck 200 depicted in FIGS. 2A-2C, in accordance with an example embodiment. Referring to FIG. 1, the control system 100 may include sensors 110 that collect data and information provided to a central computer system 140 to perform operations including, for example, control operations that control components of the vehicle via a gateway 180. Pursuant to some embodiments, gateway 180 is configured to allow the central computer system 140 to control different components from different manufacturers.

Central computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identity lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory by to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method (e.g., a sensor trigger hub) disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram(s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

In some aspects, a GNNS or GPS receiver may be integrated with other sensors, such as an IMU (e.g., FIG. 1, GNSS/IMU 118), an INS, a camera (e.g., FIG. 1, 112), a lidar (e.g., FIG. 1, 114), as well as other sensors and devices. The PPS signal output from the GPS receiver may be used as a benchmark for synchronization with these sensors. In some instances, the rising edge of the PPS signal indicates the top-of-second (i.e., start of the second).

A number of sensor vendors provide sensors with a trigger input that is used to internally timestamp on the top-of-second. If all the sensors in a particular system can be triggered with the top-of-second time, then the sensors' internal time will be synchronized to the trigger input (i.e., the GPS PPS). In such a scenario, all the sensor data from the different sensors can be correlated to the same timestamp.

Correlation of data from the various sensors in an autonomous or semi-autonomous vehicle is an important factor to optimize self-driving vehicle system performance since it may be used to resolve time uncertainties in the data. For example, the time synchronization in the collected data might be needed to reduce or eliminate time uncertainties and determine the timing of events in the captured data.

As another example, a goal of a self-driving vehicle system might be to have the vehicle positioned centered on a line, ±10 cm left or right of the line. In this example scenario, a camera captures an image at a known physical location (e.g., GPS coordinates from the GPS unit) and the surrounding scene. However, without accurate time synchronization between the different sensors and computer(s) on the vehicle, a lack of knowledge regarding the time uncertainties in the timing of the different sensor data might inhibit or prevent the desired tight operating boundaries on the self-driving vehicle as the images or sensed data captured by the sensors may not be aligned at the same time.

One of the challenges associated with time synchronization between the different and varied (i.e., heterogenous) sensors that might be integrated into a self-driving vehicle is that for each sensor, many vendors or sensor manufacturers might not adhere to any particular specification or standardization regarding the input trigger system for their sensor. For example, some sensors expect an inverted signal and other sensors do not; some sensors might trigger on both the rising edges and falling edges of the trigger signal whereas other sensors may trigger on only one of the rising edge or the falling edge of a particular trigger waveform as "designed"; some sensors might require a higher output than the GPS PPS's native 1 Hz (e.g., a camera might require that the 1 Hz PPS trigger signal be converted to a 20 Hz signal that is phase-coordinated to the 1 Hz signal so that it is perfectly aligned), etc.

Given scenarios where different sensors may have different input trigger requirements, a sensor trigger system desired that is flexible and capable of receiving, for example, a 1 Hz GPS PPS signal input and generating a series of output signals suitable to feed the various sensors that might be included in a self-driving vehicle with the appropriate trigger signaling that each sensor requires.

In some aspects, some embodiments of the present disclosure provide a system, method, and other mechanisms of a sensor trigger hub that may facilitate and support the integration of different and/or new sensors into an autonomous vehicle, without limitations based on trigger requirements of the sensors.

In some aspects, many sensors may have a GPS PPS top-of-second trigger input, although the different sensors might have different signal characteristic requirements (e.g., frequency and phase offset relative to the trigger input, inverted (e.g., if the PPS pulse is normally high (low) and triggers a quick low (high) pulse, then the sensor trigger hub can be programmed to invert that direction), etc.)

Figure 3:
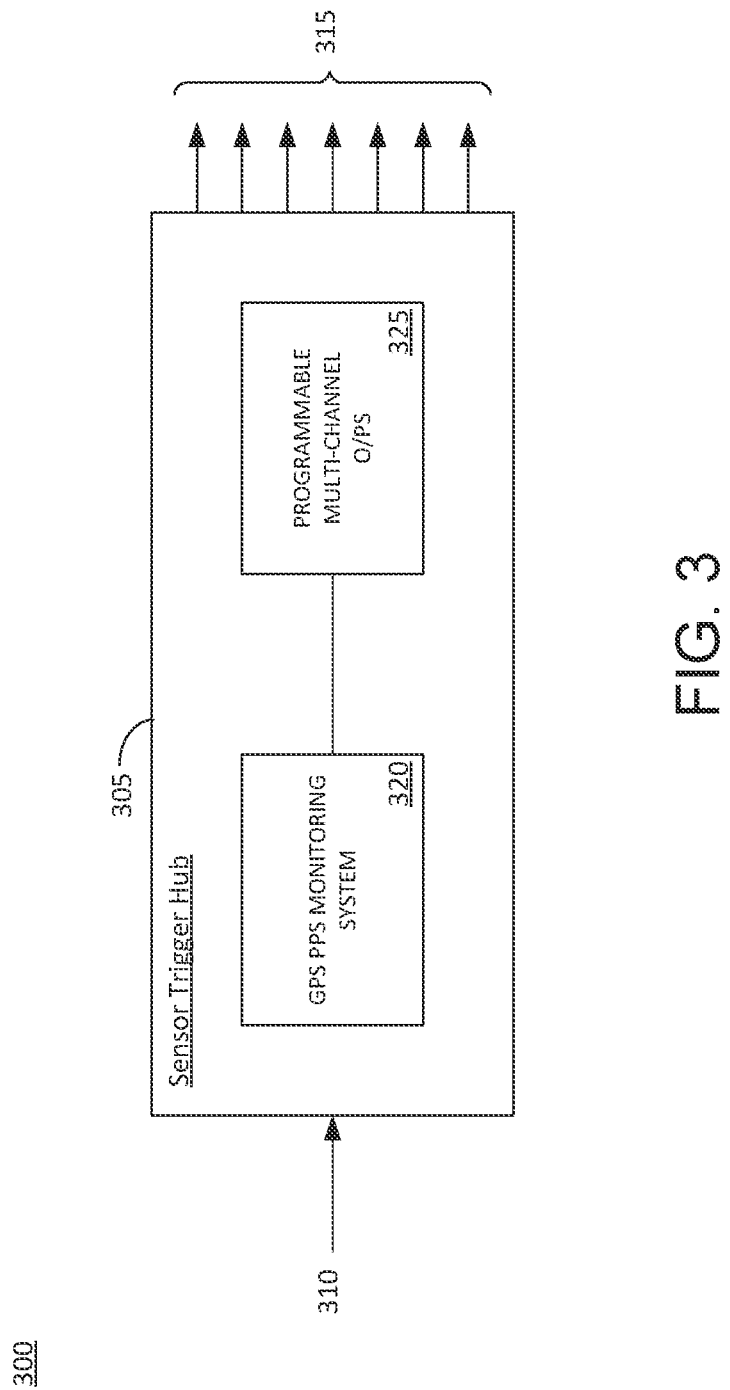
FIG. 3 is an illustrative block diagram of a sensor trigger hub, in accordance with an example embodiment.

FIG. 3 is an illustrative block diagram 300 of a sensor trigger hub, in accordance with an example embodiment. Sensor trigger hub 305 may be included in, connected to, or integrated with an autonomous or semi-autonomous vehicle system (e.g., FIGS. 1 and 2A-2C), though not limited thereto. Sensor trigger hub 305 might be configured to receive an input 310 and generate a plurality of outputs 315. Input 310 may be a GPS PPS signal generated by a GPS receiver located in the vehicle. Sensor trigger hub 305 may (logically) include a GPS PPS monitoring system (e.g., circuitry) 320 and a programmable multi-channel output system or circuitry 325.

In some aspects, sensor trigger hub 305 might be configurable to support multiple, different GPS units. For example, sensor trigger hub 305 might be able to receive GPS PPS signals having different characteristics, within a predetermined tolerance. For example, some GPS units may generate a PPS pulse that is 1 ms high while other units may generate a PPS pulse that is Bus long.

In some embodiments, a primary function of GPS PPS monitoring system 320 is to detect and monitor the GPS PPS received from the GPS receiver in the vehicle (not shown in FIG. 3) as input 310. In some regards, GPS PPS monitoring system 320 might operate to verify whether the GPS PPS signal is present (or missing), and whether this signal is running too fast or too slow. Detection and verification that the PPS output received from a GPS unit at 310 is within a predetermined tolerance (e.g., 1 Hz±5%) may be useful in determining, for example, whether the GPS unit(s) providing the PPS as an input at 310 are trustworthy of providing a PPS signal that can be relied upon.

In some embodiments, sensor trigger hub 305 might include some functionality directed to ensuring the GPS PPS signal used as an input thereto is as it should be (i.e., trustworthy). These functional features may include, for example, an internal clock system that generates its own PPS signal and synchronizes itself automatically to the GPS PPS top-of-second. In an instance that the PPS top-of-second disappears, the internal clock of the sensor trigger hub might continue to generate a heartbeat for the vehicle to ensure that systems therein (e.g., FIG. 2, semi-truck 200) receive their expected PPS input trigger signal and do not go down due to the lack of a trigger. Another example feature might include a capability to (at least periodically, though it may be continually) monitor the GPS PPS signal to detect whether the GPS PPS signal speeds up (slows down) in frequency. The detection and determination that the GPS PPS signal is either too fast or too slow by GPS PPS monitoring system 320 might cause the GPS PPS monitoring system to generate a message (e.g., status message, error message, "kill" message, etc.) that can be communicated to a computer of the self-driving vehicle. In some instances, GPS PPS monitoring system 320, alone and/or in combination with the computer (or other device or system) of the self-driving vehicle might operate to disable the self-driving in response to the determination that the GPS PPS is not present or not within an acceptable tolerance. The PPS signal generated by GPS PPS monitoring system 320 may be used by programmable multi-channel output system 325.

In some instances, some sensors onboard a vehicle (e.g., FIG. 1, sensors 110) might not actually start outputting data at the trigger pulse time (i.e., that very instant) when triggered. In order to accommodate some such sensors, a phase delay might be added to move the top-of-second signal back and forwards, as appropriate. Accordingly, in some embodiments, sensor trigger hub 305 generates a plurality of outputs wherein programmable multi-channel output system 325 provides a functionality to selectively and programmatically adjust at least one of the frequency and phase offsets of each of the plurality of outputs 315 generated by the sensor trigger hub. In some aspects, programmable multi-channel output system 325 provides a mechanism to allow for a tight bound when triggering a sensor (i.e., precise trigger control) by adjusting the triggering of sensors backwards or forward in time, on an individual per channel basis, independent of other output channels, to enable all of the sensor(s) to acquire data at the same time.

In some embodiments, trigger sensor hub 305 may be implemented primarily in hardware, including configurable programmable hardware components such as, for example, a programmable logic device (PLD), a field programmable gate array (FPGA), etc. In one PLD embodiment, the trigger sensor hub may be embodied as a PLD including a CPU core, on-chip RAM and flash memories, clock sources, timers, and an interrupt controller, as well as a digital system and an analog system that each include a number of blocks that can be programmatically configured and reconfigured to perform a number of desired functions.

As an example of the adaptability and flexibility of a sensor trigger hub herein, consider a sensor having PPS input that, at least occasionally, triggers on both the rising and falling edges of the trigger pulse thereto so that when a trigger pulse provided to the sensor goes low, the sensor will reset its internal counter on the rising edge and also reset its internal counter on the falling edge. Such a scenario might cause an issue in a self-driving vehicle system. However, a programmable sensor trigger hub of the present disclosure may be selectively programmed so that the trigger pulse time that the trigger hub regenerates for the sensor is shortened (i.e., shaped) to about 8 microseconds. At this length, the trigger pulse for the sensor is so short that even though the inertial unit might still falsely reset on the rising and falling edges, the triggering pulse is so short that the resets will happen so quickly that this sensor can still produce the right/correct timestamped outputs for its data. In some aspects, the functionality to reprogram a sensor trigger hub disclosed herein on-the-fly facilitates and supports integrating the sensor trigger hub with different, multiple (e.g., new or updated) sensors.

In some embodiments, the timing, pulse shaping, frequency shifting, and phase shifting control may be provided via a firmware implementation. In one embodiment, the hardware components of the sensor trigger hub (e.g., a PLD implementation) generates the trigger(s) to be provided to the sensors and the firmware controls the values of the parameters (e.g., frequency, shape, and phase) of the generated trigger(s).

In one embodiment, a sensor trigger hub herein may be implemented as a PLD designed using a drag and drop (or other type of) block editor application or design tool to plan a digital circuit and the chip is then reprogrammed to act like the digital circuit design in hardware. Being implemented in hardware, the sensor trigger hub herein is extremely stable and produces perfect waveforms at all times.

In some embodiments, the processor onboard the PLD provides a mechanism to dynamically reconfigure the settings of the sensor trigger hub. In some instances, the computer system (e.g., FIG. 1, computer 140) of the truck in which the sensor trigger hub is deployed can issue messages over a communication channel (e.g., controller area network (CAN) bus or the like) that interconnects the sensor trigger hub with other sensors and devices of the vehicle embedded system. In some aspects, the computer system can issue commands, either automatically in response to one or more signals, commands, or messages from a sensor, device, or (sub-)system of the vehicle or authorized personnel, to adjust at least one of the frequency offset, phase offset, and signal shape of any of the output channels of the sensor trigger hub, independently of each other. The sensor trigger hub may also communicate back to the computer a current status of its system(s) and an indication of the monitored PPS pulse received from the GPS unit.

In some embodiments, a sensor trigger hub herein might include functionality to dynamically reconfigure one or more of the sensor trigger hub's outputs on-demand in response to new, changed, or faulty timing of a sensor (e.g., a camera that is not triggering properly).

Figure 4:
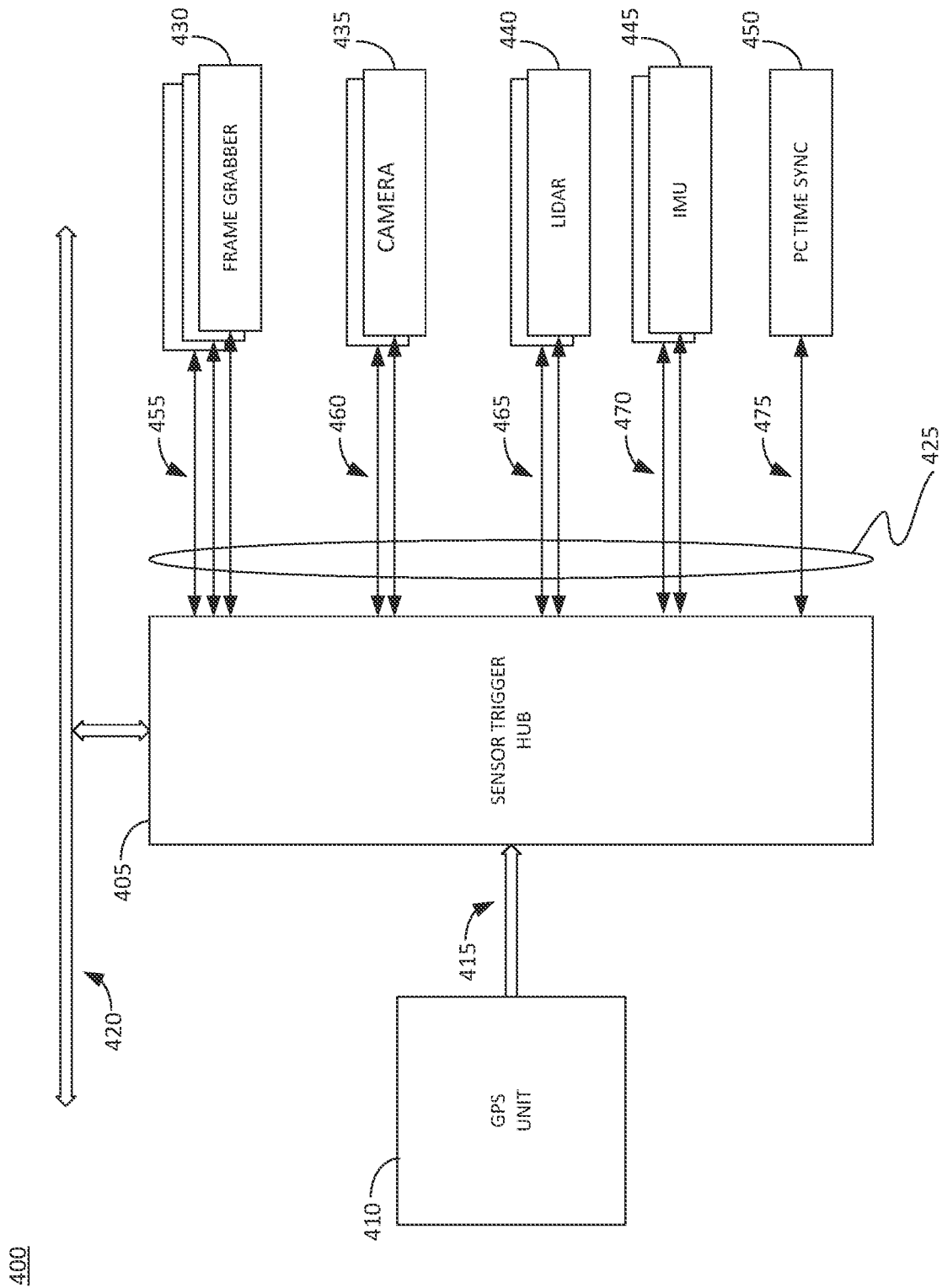
FIG. 4 is an illustrative block diagram of a system associated with a sensor trigger hub herein, in accordance with an example embodiment.

FIG. 4 is an illustrative block diagram of a system 400 associated with a sensor trigger hub herein, in accordance with an example embodiment. System 400 includes a sensor trigger hub 405. Sensor trigger hub 405 might be implemented the same as or similar to the sensor trigger hub discussed with regards to FIG. 3. Accordingly, sensor trigger hub 405 is not discussed in detail since an understanding thereof can be had by referring to sensor trigger sensor hub 305 in FIG. 3.

As shown, sensor trigger sensor hub 405 receives a GPS PPS signal 415 from GPS unit (i.e., a GPS receiver) 410. Sensor trigger hub 405 may operate to synchronize its internal clock(s) with the GPS PPS signal it receives to generate a plurality of independently programmed output triggers 425. Sensor trigger hub 405 is interfaced with or otherwise connected to sensors and other components of a vehicle (e.g., FIG. 1, sensors 110, computer 140, etc. and FIGS. 2A-2C, semi-truck 200) via a communication channel or bus 420 (e.g., CAN bus).

FIG. 4 illustratively discloses, in some embodiments, that the output triggers 425 generated by sensor trigger hub 405 provide triggers (e.g., 10 trigger signals) to one or more sensors or other components. In the example of FIG. 4, the sensor trigger hub provides camera triggers 455 (@20 Hz) to frame grabbers 430, camera triggers 460 (@20 Hz) to ethernet cameras 435, lidar triggers 465 (@1 Hz) to lidars 440, IMU triggers 470 (@1 Hz) to IMUs 445, and a control PPS trigger 475 (@1 Hz) to a computer time synchronizer 450.

Figure 5:
FIG. 5 is a tabular listing of example triggers generated by a sensor trigger hub, in accordance with an example embodiment.

FIG. 5 is a tabular listing of example triggers generated by a sensor trigger hub, in accordance with an example embodiment. Table 500 may correspond to the sensor trigger hub 405 shown in the example of FIG. 4. In particular, table 500 lists the types of triggers 505 generated by sensor trigger hub 405, the frequency of each type of trigger at 510, and the trigger requirements for the interfacing sensor/device at 515.

Figure 6:
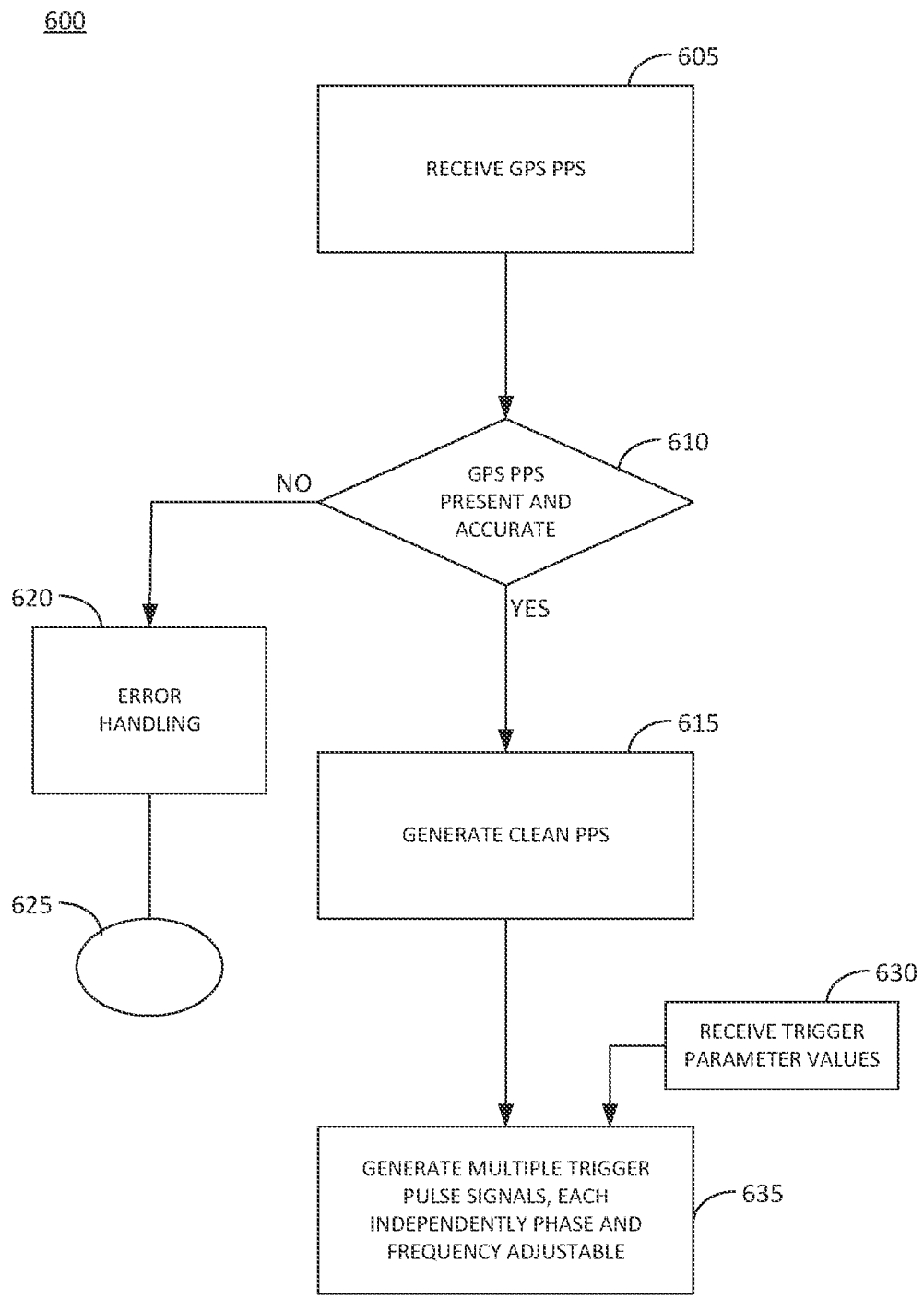
FIG. 6 is an illustrative flow diagram of a process, in accordance with an example embodiment.

FIG. 6 is an illustrative flow diagram of a process 600, in accordance with an example embodiment. In some aspects, process 600 and portions thereof may be implemented by one or more of the systems and apparatuses disclosed herein (e.g., FIGS. 1, 2A-2C, 3, 4, and 7). At operation 605, a sensor trigger hub, consistent with the present disclosure, receives a GPS PPS signal from a GPS receiver embedded or otherwise located on a vehicle the same as the sensor trigger hub and a plurality of sensors. At operation 610, a GPS PPS monitoring system (FIG. 3, 320; a first hardware implemented circuitry of the sensor trigger hub) monitors the GPS PPS signal generated by the GPS receiver for an indication of a presence and a frequency of the GPS PPS signal, within a predetermined threshold.

In the instance the determination at operation 610 concludes the indication of the presence and the frequency of the GPS PPS signal are within the predetermined threshold, operation 610 proceeds to operation 615 to generate a generated PPS signal that is synchronized with the GPS PPS signal (e.g., the top-of-second time thereof).

In the instance the determination at operation 610 concludes the indication of the presence and the frequency of the GPS PPS signal are not within the predetermined threshold, then operation 610 proceeds to operation 620, an error handling process or procedure. Operation 620 might include generating a message indicative of a status of the GPS PPS signal and transmitting the message to a system (e.g., FIG. 1, computer 140) onboard the vehicle. In some instances, the detection of an absence of the GPS PPS or an unacceptable signal thereof might result in stopping the operation of the vehicle and thus a termination of process 600 at 625. In some embodiments, the first hardware implemented circuitry might continue to generate the generated PPS signal, in the instance the GPS PPS signal ceases to be received, for at least a predetermined duration of time. For example, the GPS PPS signal may continue to be generated indefinitely with extraordinarily little frequency or phase drift giving the self-driving system time to safely bring the vehicle to a stop for triage. In some embodiments, a sensor trigger hub herein might operate continuously without a GPS PPS, though it might not be synced with any particular time if it did not originally sync with a GPS PPS to set a baseline time.

Continuing process 600 from operation 615 to operation 635, a second hardware implemented circuitry of the sensor trigger hub (e.g., FIG. 3, programmable multi-channel output system 325) generates, based on an input of the generated PPS signal from operation 615 and trigger parameter values 630 (e.g., from authorized personnel, system, etc.) a plurality of trigger signals. Each of the generated plurality of trigger signals may be selectively programmatically adjustable in at least one of a frequency, a phase, and shape, where the selectively adjustability of each of the generated plurality of trigger signals is independent of the other generated plurality of trigger signals. In some embodiments, the phase of the generated plurality of trigger signals are, independently of each other generated trigger signal, programmatically selectively adjustable over a range of about 1 Hz to about 1000 Hz. Process 600 further includes transmitting at least one of the generated plurality of trigger signals to one or more of the sensors in the vehicle.

Figure 7:
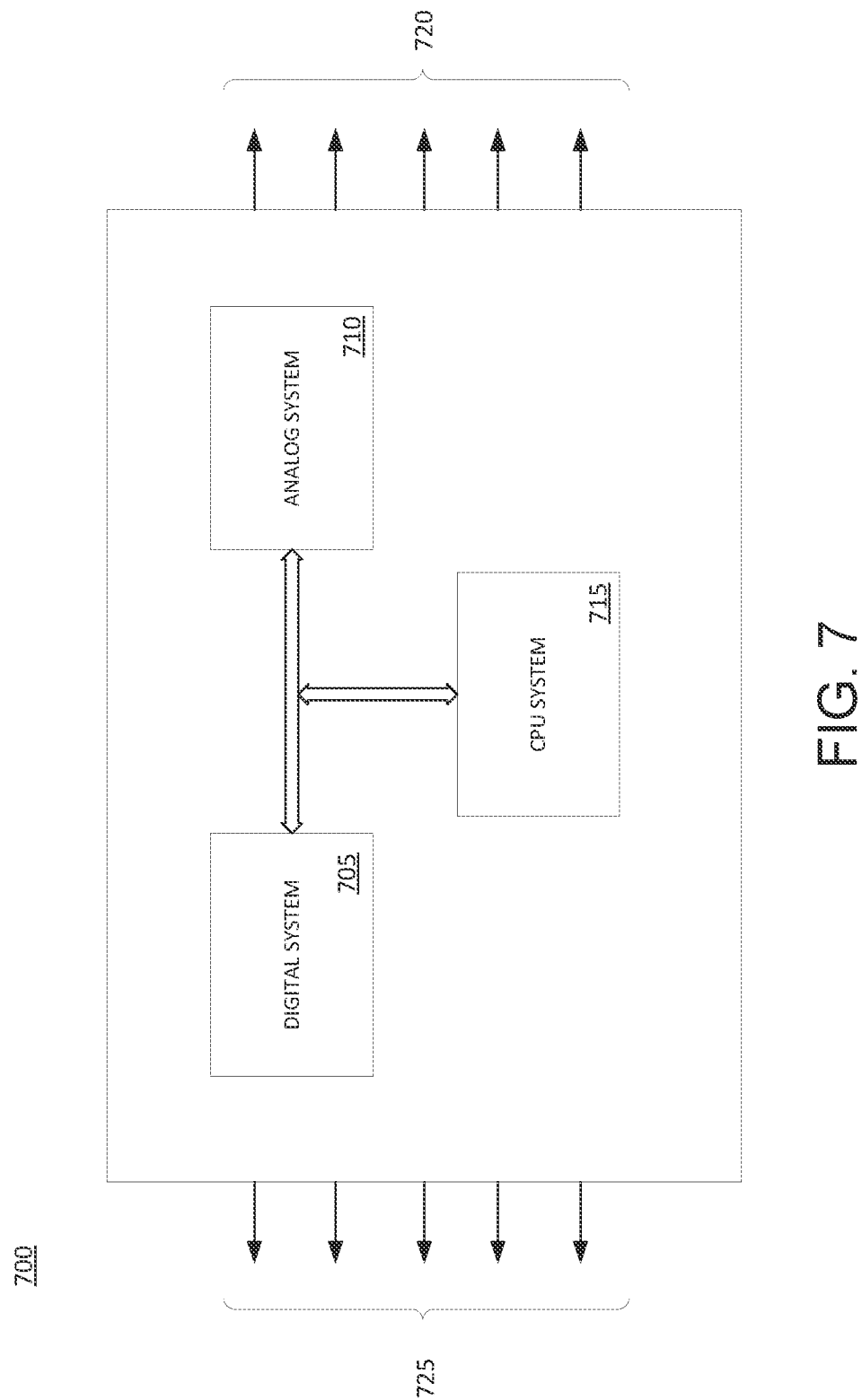
FIG. 7 is an illustrative block diagram of a programmable processor-based system, in accordance with an example embodiment.

FIG. 7 is an illustrative block diagram of a programmable processor-based system that may be used in any of the system architectures or frameworks (e.g., FIGS. 1-4) and processes (e.g., FIG. 6, process 600) disclosed herein, in accordance with an example embodiment. In some embodiments, system 700 includes a PLD implementation of a trigger sensor hub herein. System 700 may be embodied as a PLD including a digital system 705 that includes a number of digital blocks, an analog system 710 that includes a number of analog blocks, and a CPU system 715. CPU system 715 may include (though not shown in FIG. 7) on-chip RAM and flash memories, clock sources, timers, and an interrupt controller, and other circuitry. CPU system 715, digital system 705, and analog system 710 may be connected to each other through configurable interconnects in a designed configuration to provide the embodiments of the sensor trigger hub system and processes disclosed herein. CPU system 715 may comprise program code (e.g., firmware) executed by processor(s) to cause sensor trigger hub of system 700 to perform one or more of the processes or functions described herein. The provided collection of digital and analog blocks may be programmatically configured and reconfigured to perform a number of desired functions, including the sensor trigger hub functions and operations disclosed herein by the disclosed example systems (e.g., FIGS. 1-4) and process(es) (e.g., FIG. 6), including the generation of a plurality of selectively and programmatically adjustable trigger signals 720 and 725.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a first component to:
receive a first global positioning system pulse per second (PPS) signal generated by a global positioning system (GPS) receiver disposed in a vehicle having a plurality of sensors;
monitor the first PPS signal generated by the GPS receiver for an indication of a presence and a frequency of the first PPS signal within a predetermined threshold; and
generate, in response to a determination of the indication of the presence and the frequency of the first PPS signal are within the predetermined threshold, a second PPS signal synchronized with the first PPS signal; and
a second component to:
generate, based on an input of the second PPS signal, a plurality of trigger signals, each of the generated plurality of trigger signals being selectively programmatically adjustable to adjust at least one of frequency and phase offsets of each of the plurality of generated plurality of trigger signals, the selectively adjustability of each of the generated plurality of trigger signals being independent of the other generated plurality of trigger signals; and
transmit at least one of the generated plurality of trigger signals to one or more of the sensors in the vehicle.

2. The system of claim 1, wherein the second component receives a message from a system onboard the vehicle, the message including information to selectively programmatically adjust at least one of the frequency and a phase of at least one of the generated plurality of trigger signals.

3. The system of claim 1, wherein the first component is further configured to:
   generate, in response to a determination the indication of at least one of the presence and the frequency of the first PPS signal are not within the predetermined threshold, a message indicative of a status of the first PPS signal; and
   transmit the message to a system onboard the vehicle.

4. The system of claim 1, wherein the first component is configured to continue to generate the second PPS signal, in an instance the first PPS signal ceases to be within the predetermined threshold.

5. The system of claim 1, wherein the second component is configured to synchronize the generation of the plurality of trigger signals based on the input of the second PPS signal.

6. The system of claim 1, wherein each of the generated plurality of trigger signals are further programmatically selectively adjustable to independently vary a shape of one or more of the generated plurality of trigger signals.

7. The system of claim 6, wherein varying a shape of one or more of the generated plurality of trigger signals includes inverting the generated trigger signals.

8. The system of claim 1, wherein a phase of each of the generated plurality of trigger signals is capable of being programmatically selectively adjustable over a range of about 1 Hz to about 1000 Hz independently of the each of the other generated trigger signals.

9. The system of claim 1, wherein the at least one generated trigger signal transmitted to the one or more of the sensors in the vehicle provides an input trigger to a plurality of the sensors.

10. A method comprising:
    receiving a first pulse per second (PPS) signal generated by a global positioning system (GPS) receiver disposed in a vehicle having a plurality of sensors;
    monitoring the first PPS signal generated by the GPS receiver for an indication of a presence and a frequency of the first PPS signal within a predetermined threshold;
    generating, in response to a determination the indication of the presence and the frequency of the first PPS signal are within the predetermined threshold, a second PPS signal synchronized with the first PPS signal;
    generating, based on an input of the second PPS signal, a plurality of trigger signals, each of the generated plurality of trigger signals being selectively programmatically adjustable to adjust at least one of frequency and phase offsets of each of the plurality of generated plurality of trigger signals, the selectively adjustability of each of the generated plurality of trigger signals being independent of the other generated plurality of trigger signals; and
    transmitting at least one of the generated plurality of trigger signals to one or more of the sensors in the vehicle.

11. The method of claim 10, further comprising receiving a message from a system onboard the vehicle, the message including information to selectively programmatically adjust at least one of the frequency and a phase of at least one of the generated plurality of trigger signals.

12. The method of claim 10, further comprising:
    generating, in response to a determination the indication of at least one of the presence and the frequency of the first PPS signal are not within the predetermined threshold, a message indicative of a status of the first PPS signal; and
    transmitting the message to a system onboard the vehicle.

13. The method of claim 10, further comprising continuing to generate the second PPS signal, in an instance the first PPS signal ceases to be received within the predetermined threshold.

14. The method of claim 10, wherein each of the generated plurality of trigger signals are further programmatically selectively adjustable to independently vary a shape of one or more of the generated plurality of trigger signals.

15. The method of claim 10, wherein a phase of each of the generated plurality of trigger signals are capable of being programmatically selectively adjustable over a range of about 1 Hz to about 1000 Hz independently of the each of the other generated trigger signals.

16. A vehicle comprising:
    a plurality of sensors;
    a global positioning system (GPS) receiver disposed in the vehicle; and
    a system disposed in the vehicle and coupled to the plurality of sensors and the GPS receiver via a communication bus, the system comprising:
      a first component to:
        receive a first pulse per second (PPS) signal generated by the GPS receiver;
        monitor the first PPS signal generated by the GPS receiver for an indication of a presence and a frequency of the first PPS signal within a predetermined threshold; and
        generate, in response to a determination the indication of the presence and the frequency of the first PPS signal are within the predetermined threshold, a second PPS signal synchronized with the first PPS signal; and
      a second component to:
        generate, based on an input of the second PPS signal, a plurality of trigger signals, each of the generated plurality of trigger signals being selectively programmatically adjustable to adjust at least one of frequency and phase offsets of each of the plurality of generated plurality of trigger signals, the selectively adjustability of each of the generated plurality of trigger signals being independent of the other generated plurality of trigger signals; and
        transmit at least one of the generated plurality of trigger signals to one or more of the sensors.

17. The vehicle of claim 16, wherein the at least one generated trigger signal transmitted to the one or more of the sensors in the vehicle provides an input trigger to a plurality of the sensors.

18. The vehicle of claim 16, wherein the second component receives a message over the communication bus, the message including information to selectively programmatically adjust at least one of the frequency and a phase of at least one of the generated plurality of trigger signals.

19. The vehicle of claim 16, wherein the first component is further configured to:
    generate, in response to a determination the indication of at least one of the presence and the frequency of the first PPS signal are not within the predetermined threshold, a message indicative of a status of the first PPS signal; and
    transmit, over the communication bus, the message to a system onboard the vehicle.

20. The vehicle of claim 16, wherein the first component is configured to continue to generate the second PPS signal, in an instance the first PPS signal ceases to be received, for at least a predetermined duration of time within the predetermined threshold.

\* \* \* \* \*